(12) United States Patent
Spieker et al.

(10) Patent No.: US 10,730,498 B2
(45) Date of Patent: Aug. 4, 2020

(54) BRAKING SYSTEM INCLUDING A SECONDARY PATH TO PROVIDE FLUID TO A SECONDARY BRAKING SYSTEM

(71) Applicant: Autoliv ASP, Inc., Ogden, UT (US)

(72) Inventors: Arnie Spieker, Commerce Township, MI (US); Alexandru Versin, Rochester Hills, MI (US)

(73) Assignee: Veoneer Nissin Brake Systems Japan Co., Ltd., Kanagawa (JP)

(*) Notice: Subject to any disclaimer, the term of this patent is extended or adjusted under 35 U.S.C. 154(b) by 175 days.

(21) Appl. No.: 15/941,601

(22) Filed: Mar. 30, 2018

(65) Prior Publication Data
US 2019/0299951 A1 Oct. 3, 2019

(51) Int. Cl.
*B60T 13/14* (2006.01)
*B60T 13/66* (2006.01)
*B60T 13/68* (2006.01)
*B60T 13/74* (2006.01)

(52) U.S. Cl.
CPC .......... *B60T 13/146* (2013.01); *B60T 13/662* (2013.01); *B60T 13/686* (2013.01); *B60T 13/745* (2013.01); *B60T 2270/306* (2013.01); *B60T 2270/402* (2013.01)

(58) Field of Classification Search
CPC ...... B60T 7/042; B60T 13/586; B60T 13/142; B60T 13/146; B60T 13/662; B60T 13/745; B60T 13/665; B60T 13/686; B60T 8/00; B60T 8/34; B60T 8/4081; B60T 8/441;
(Continued)

(56) References Cited

U.S. PATENT DOCUMENTS 4,629,258 A * 12/1986 Resch .................... B60T 8/445
                                                                 303/113.4
5,112,115 A * 5/1992 Willmann ................ B60T 8/34
                                                                 188/358

(Continued)

FOREIGN PATENT DOCUMENTS

JP       H8-258679 A     10/1996

OTHER PUBLICATIONS

International Search Report and Written Opinion issued in corresponding Application No. PCT/IB2019/052551, dated Jul. 23, 2019.

*Primary Examiner* — Robert A. Siconolfi
*Assistant Examiner* — San M Aung
(74) *Attorney, Agent, or Firm* — Carrier Blackman & Associates, P.C.; Joseph P. Carrier; William D. Blackman

(57) ABSTRACT

The present disclosure relates to a system for building pressure within a secondary braking system (SBS) of a vehicle having a plurality of brakes. The system may comprise a reservoir and a primary braking system (PBS) including a master cylinder including a primary circuit portion, a plurality of valve subsystems, a primary path connecting the master cylinder to the plurality of valve subsystems, and at least one valve disposed along the primary path between the master cylinder and the plurality of valve subsystems. The PBS also includes a secondary path connecting the reservoir to at least one valve subsystem of the plurality of valve subsystems, and no valves are disposed within the secondary path. The SBS is connected to the at least one valve subsystem.

13 Claims, 4 Drawing Sheets

(58) Field of Classification Search
 CPC ............... B60T 17/221; B60T 15/041; B60T 2270/402; B60T 2270/406; B60L 7/24
 USPC ............ 303/3, 10–11, 20, 113.4, 114.1, 155
 See application file for complete search history.

(56) References Cited

U.S. PATENT DOCUMENTS

| | | | |
|---|---|---|---|
| 5,172,962 A * | 12/1992 | Takata | B60T 8/4225 |
| | | | 303/113.2 |
| 5,609,399 A * | 3/1997 | Feigel | B60T 8/3265 |
| | | | 188/162 |
| 9,409,559 B2 | 8/2016 | Ozsoylu et al. | |
| 9,656,638 B2 | 5/2017 | Rydsmo et al. | |
| 2014/0210253 A1* | 7/2014 | Okano | B60T 7/042 |
| | | | 303/6.01 |
| 2017/0008497 A1 | 1/2017 | Svensson et al. | |
| 2017/0036651 A1 | 2/2017 | Svensson et al. | |
| 2018/0118183 A1 | 5/2018 | Spieker | |

* cited by examiner

BRAKING SYSTEM INCLUDING A SECONDARY PATH TO PROVIDE FLUID TO A SECONDARY BRAKING SYSTEM

FIELD

The present disclosure relates to braking system for motor vehicles, and more particularly to a system that includes a secondary path that provides hydraulic fluid from a reservoir to a secondary braking system.

BACKGROUND

The statements in this section merely provide background information related to the present disclosure and may not constitute prior art.

Braking systems used on motor vehicles such as passenger cars and trucks often employ a Primary Brake System ("PBS") and a Secondary Brake System ("SBS"), which are hydraulically connected in series. The PBS provides the main means for generating brake pressure to the brake calipers associated with the four wheels of the vehicle. The PBS does this while constantly monitoring the hydraulic fluid that it applies and the pressure it generates, internal to the PBS itself.

The SBS often forms a portion of an Electronic Stability Control System ("ESC"). The ESC system is able to independently control hydraulic pressure applied to the brake calipers of at least two wheels of the vehicle, often the front right and front left brakes calipers, in response to detected braking conditions (e.g., emergency evasive braking maneuver), with a goal of maintaining control of the vehicle. The SBS also forms a backup braking system which is able to hydraulically control the brake fluid applied to at least two brakes of the vehicle in the event that a failure occurs in the PBS. The SBS can be used in the rare instance failure within the PBS occurs. This is especially so if the system is being used in an autonomous vehicle.

SUMMARY

In one aspect, the present disclosure relates to a system for building pressure within a secondary braking system (SBS) of a vehicle having a plurality of brakes. The system may comprise a reservoir and a primary braking system (PBS) including a master cylinder including a primary circuit portion, a plurality of valve subsystems, a primary path connecting the master cylinder to the plurality of valve subsystems, and at least one valve disposed along the primary path between the master cylinder and the plurality of valve subsystems. The PBS also includes a secondary path connecting the reservoir to at least one valve subsystem of the plurality of valve subsystems, and no valves are disposed within the secondary path. The SBS is connected to the at least one valve subsystem.

In another aspect, the present disclosure relates to a system for building pressure within a secondary braking system (SBS) of a vehicle having a plurality of brakes. The system may comprise a primary braking system (PBS) including a master cylinder including a primary circuit portion and a reservoir, a plurality of valve subsystems, a primary path connecting the master cylinder to the plurality of valve subsystems, and at least one valve disposed along the primary path between the master cylinder and the plurality of valve subsystems. The PBS also includes a secondary path connecting the reservoir to at least one valve subsystem of the plurality of valve subsystems, and the SBS is connected to the at least one valve subsystem.

In still another aspect, the present disclosure relates to a system for building pressure within a secondary braking system (SBS) of a vehicle having a plurality of brakes. The system may comprise a primary braking system (PBS) including a master cylinder including a primary circuit portion and a reservoir, a plurality of valve subsystems, a primary path connecting the master cylinder to the plurality of valve subsystems, and at least one valve disposed along the primary path between the master cylinder and the plurality of valve subsystems. The PBS also includes a secondary path connecting the reservoir to at least one valve subsystem of the plurality of valve subsystems, and the SBS is connected to the at least one valve subsystem. The at least one valve subsystem includes a one-way valve that is configured to receive hydraulic fluid from the secondary path and output the hydraulic fluid to the SBS.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
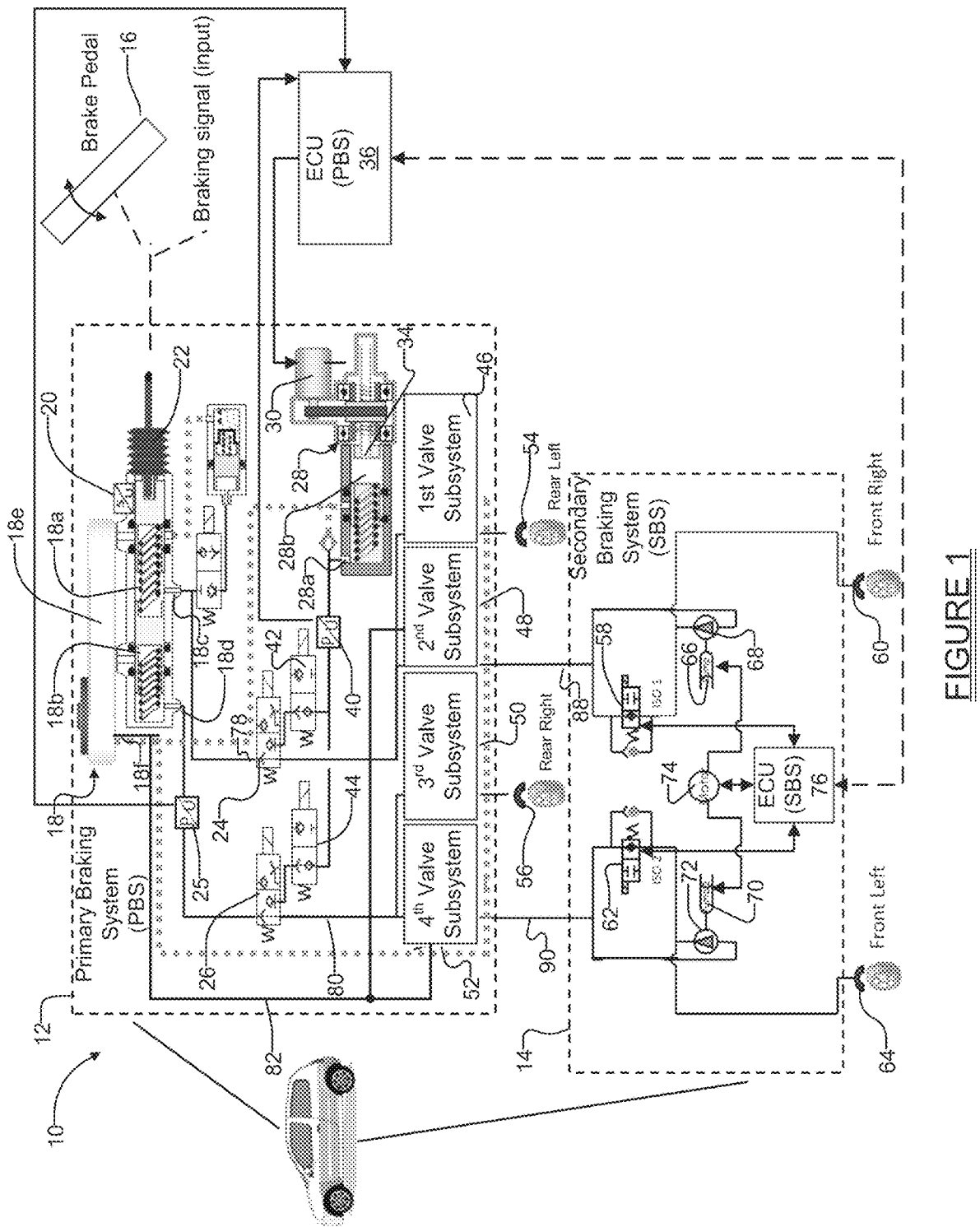
FIG. 1 shows a high level block diagram of one embodiment of a validation system of the present disclosure in which a Secondary Braking System (SBS) is hydraulically connected in series with a Primary Braking System (PBS)

The following description is merely exemplary in nature and is not intended to limit the present disclosure, application, or uses. It should be understood that throughout the drawings, corresponding reference numerals indicate like or corresponding parts and features.

In the event of a PBS failure, the SBS builds pressure to the brakes associated with the front wheels by turning on a pump motor and drawing fluid from a reservoir. However, one or more valves can be disposed within the path from the reservoir to the SBS, which restricts the flow of fluid to the SBS pump inlet and limiting the pressure build rate. The resultant pressure build rate may not be sufficient to meet the requirements of the vehicle system. The present disclosure describes a braking system that includes a secondary path for providing hydraulic fluid from the reservoir to the SBS, which increases the pressure build rate.

FIG. 1 illustrates a system 10 in accordance with one embodiment of the present disclosure. The system 10 includes a Primary Braking System ("PBS") 12 and a Secondary Braking System 14 ("SBS") which are connected hydraulically in series.

The PBS 12 may include a brake pedal 16 or other component which provides an input braking signal to a master cylinder 18. The master cylinder includes a stroke sensor 20 for sensing a stroke of the brake pedal 16 (assuming a brake pedal is incorporated). A pedal feel simulator valve ("PFSV") 22 may be in communication with an output port 18*c* of a primary circuit portion 18*a* of the master cylinder 18 and also with a primary circuit first master cut valve ("MCV") 24. A secondary circuit portion 18*b* of the master cylinder 18 may be in communication with a first pressure sensor 25 via an output port 18*d*, which is in turn in communication with a primary circuit second MCV 26. As shown in FIG. 1, the master cylinder 18 includes a reservoir 18*e* for storing hydraulic fluid used within the system 10.

The PBS 12 further may include a slave cylinder 28 having a cylinder portion 28*b* with an output port 28*a*. An electric motor 30 operably associated with the slave cylinder 28 may be used to drive a slave cylinder piston 34 residing within the cylinder portion 28*b* linearly in response to commands from an electronic control unit (ECU) 36 of the PBS 12. The slave cylinder 28 is used to help generate fluid pressure in the PBS 12 and the SBS 14.

The output port 28*a* of the slave cylinder 28 may be in communication with a pressure sensor 40, which in turn may be in communication with a first apply valve (APV) 42 and a second APV 44. The first and second APVs 42 and 44 may be in communication with MCVs 24 and 26, respectively. In this manner, fluid pressure generated by the slave cylinder 28 can be used to help pressurize both the PBS 12 and the SBS 14.

The first MCV 24 may be in communication with first and second valve subsystems 46 and 48, respectively. The second MCV 26 may be in communication with third and fourth valve subsystems 50 and 52, respectively. First valve subsystem 46 in this example controls the flow of hydraulic fluid flow to the rear left brake caliper 54, while third valve subsystem 50 controls the hydraulic fluid flow to a rear right brake caliper 56. As shown, second valve subsystem 48 communicates with a first isolation ("ISO") valve 58 of the SBS 14, which in this example helps to control the hydraulic flow to a front right brake caliper 60. The fourth valve subsystem 52 communicates with a second ISO valve 62 of the SBS 14, which in this example helps to control hydraulic fluid flow to a front left brake caliper 64.

In addition to the first and second ISO valves 58 and 62, the SBS 14 may also include a first pump 66 and a one-way valve 68, which enable communication of the first pump with the second valve subsystem 48 and also with the front right brake caliper 60. A second pump 70 and a one-way valve 72 may be included which communicate with the fourth valve subsystem 52 and also with the front left brake caliper 64. It is understood that the one-way valves 68, 72 may be integral with the respective pumps 66, 70 in various implementations. The SBS 14 may also include a motor 74 which is controlled by an electronic control unit (ECU) 76 to help raise the hydraulic fluid braking pressure in the SBS 14.

The isolation valves 58 and 62 may be used to disable excessive fluid communication from the wheel cylinders associated with the front right and front left brake calipers 60 and 64 back to the slave cylinder 28 and the master cylinder 18. The PBS 12 in this example is used to control the application of hydraulic braking fluid to all four brake calipers 54, 56, 60 and 64 during normal braking action. The SBS 14 can be used in the rare instance failure within the PBS 12 occurs. This is especially so if the system 10 is being used in an autonomous vehicle.

As shown in FIG. 1, the second valve subsystem 48 and the fourth valve subsystem 52 receive hydraulic fluid from primary paths 78, 80 and a secondary path 82. The primary path 78 provides a path for the hydraulic fluid from the output port 18*c* of the primary circuit portion 18*a* to the first and the second valve subsystems 46, 48. The primary path 80 provides a path for the hydraulic fluid from the output port 18*d* of the secondary circuit portion 18*b*.

The secondary path 82 provides a path for the hydraulic fluid from an outlet port 18*f* of the reservoir 18*e* to the second valve subsystem 48 and the fourth valve subsystem 52. In an implementation, the secondary path 82 provides an unencumbered path from the reservoir 18*e* to the second valve subsystem 48 and the fourth valve subsystem 52. For example, as illustrated in FIG. 1, the primary paths 78, 80 include multiple valves disposed between the outlet ports 18*c*, 18*d* and the valve subsystems 46, 48, 50, 52. These valves restrict the flow of hydraulic fluid to the SBS 14, which may result in a sub-optimal pressure build rate within the SBS 14.

Figure 2A:
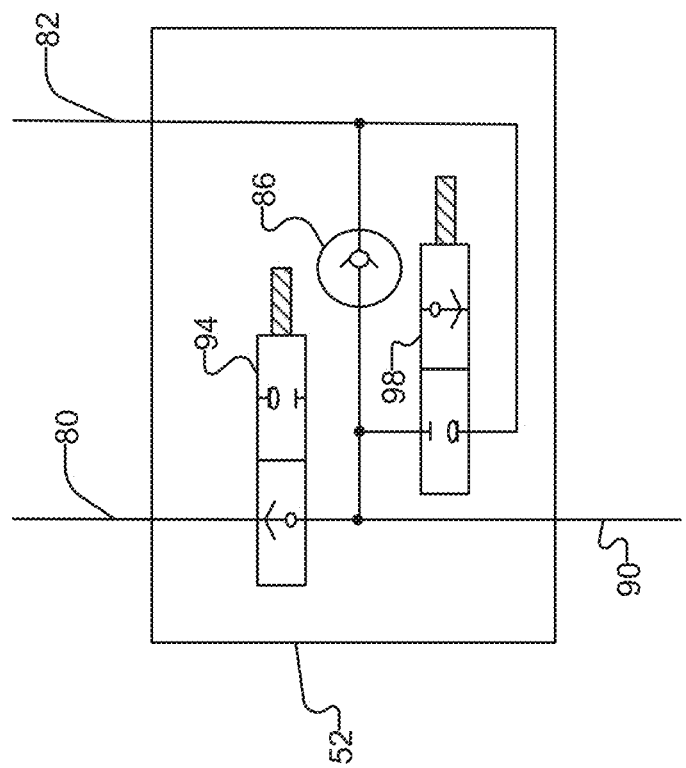
FIG. 2A is a block diagram illustrating an example valve subsystem including a one-way valve connected to a secondary path.
Figure 2B:
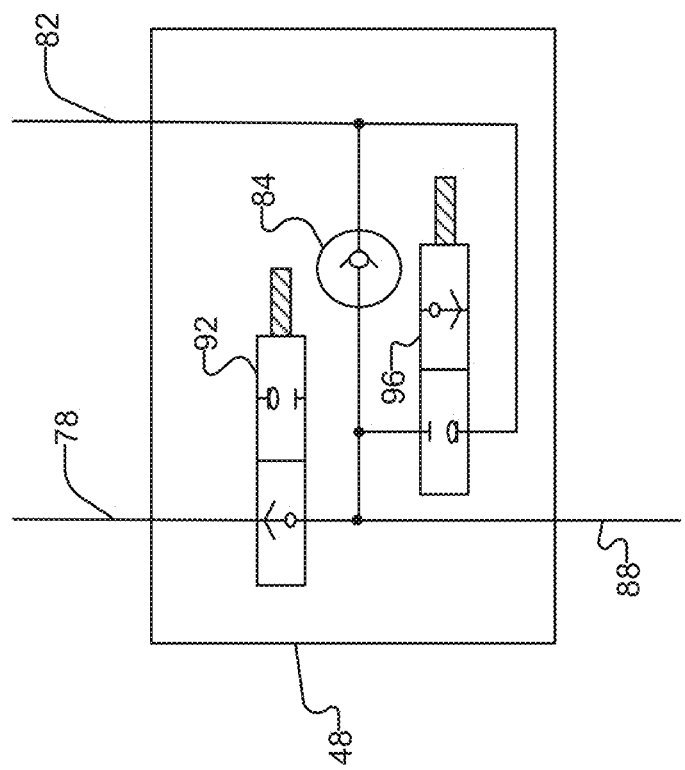
FIG. 2B is a block diagram illustrating another example valve subsystem including a one-way valve connected to a secondary path.

FIG. 2A illustrates an example second valve subsystem 48 and FIG. 2B illustrates an example fourth valve subsystem 52 in accordance with an example implementation of the present disclosure. As shown, the valve subsystems 48, 52 include a respective one-way valve 84, 86 that receive hydraulic fluid from the secondary path 82. The one-way valve 84 outputs hydraulic fluid to an outlet 88, and the one-way valve 86 outputs hydraulic fluid to an outlet 90. Referring to FIG. 1, the outlets 88, 90 are connected to the one-way valves 68, 72, respectively. Thus, the system 10 includes a less-restrictive (e.g., unencumbered) path for hydraulic fluid from the reservoir 18 *e* to the one-way valves 68, 72 within the SBS 14 to control delivery of the hydraulic fluid to the calipers 60, 64. In some implementations, the secondary path 82 includes no valves between the reservoir 18 *e* and the respective valve subsystems 48, 52.

As shown in FIGS. 2A and 2B, the second and fourth valve subsystems 48, 52 include respective MCVs 92, 94 and APVs 96, 98. The MCV 92 and APV 96 of the second valve subsystem 48 are connected to the outlet 88, and the MCV 94 and the APV 98 are connected to the outlet 90.

Figure 3:
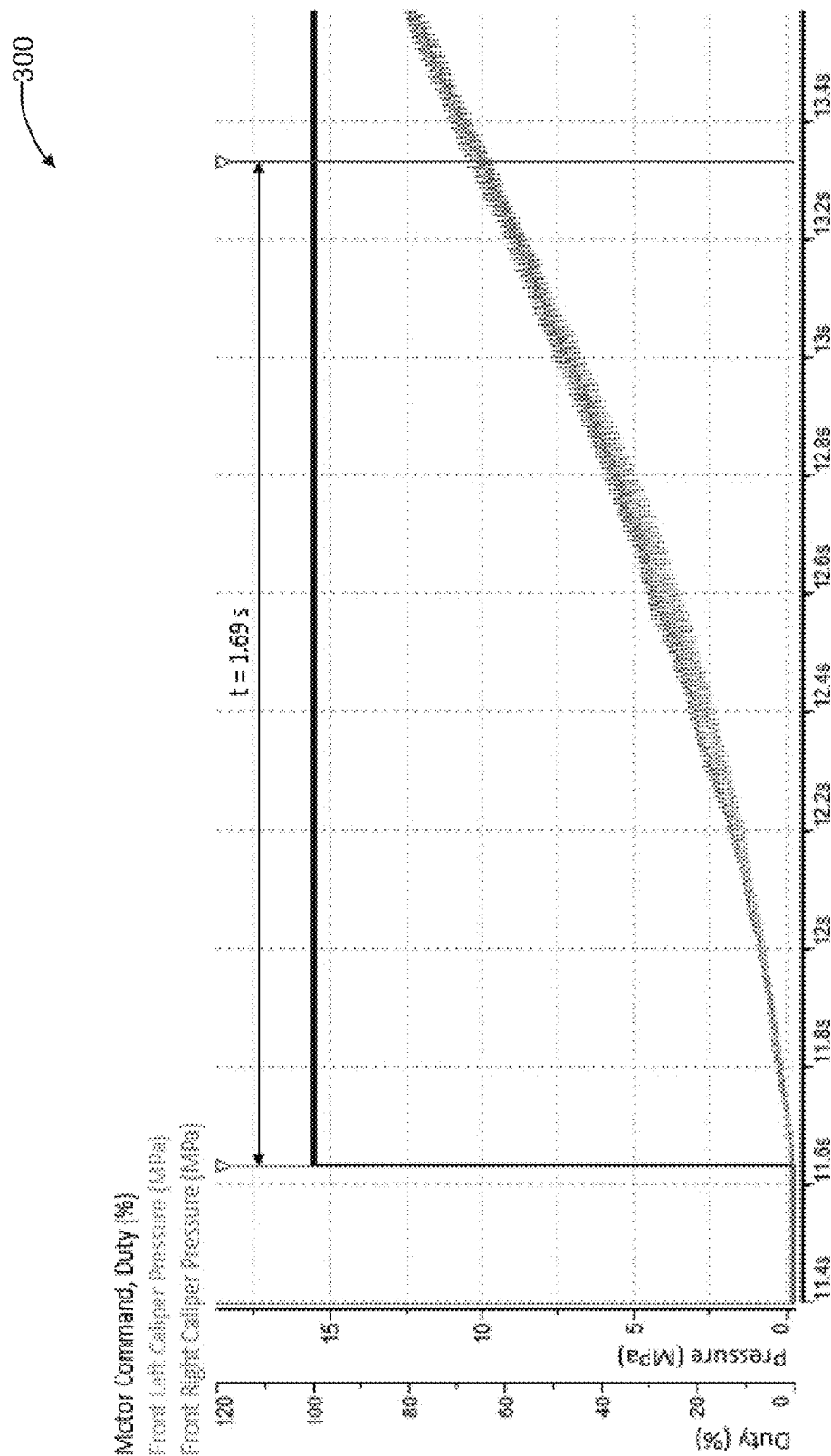
FIG. 3 is a graph illustrating an example braking pressure build of a braking system that does not incorporate the secondary path of the present disclosure.
Figure 4:
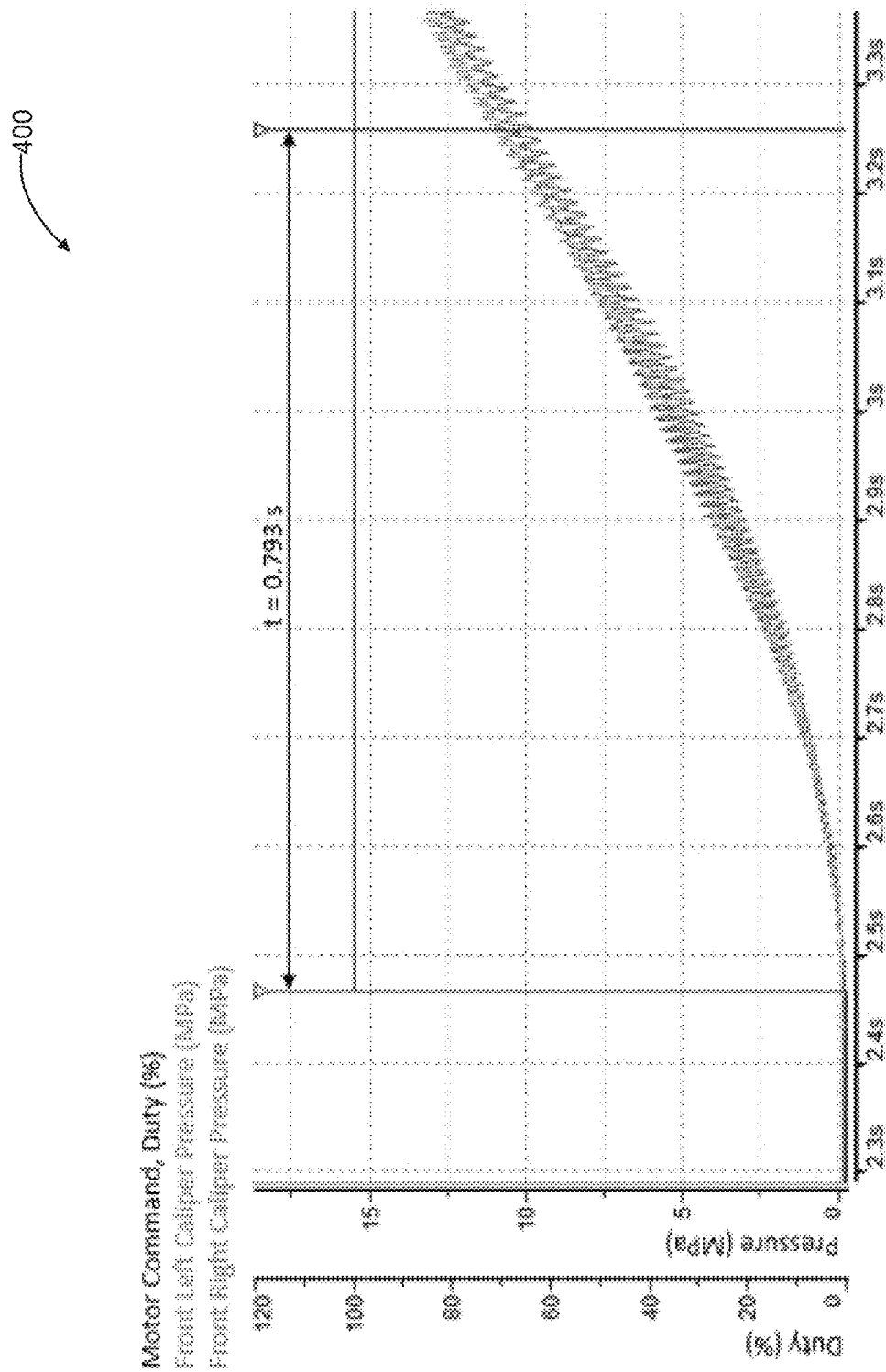
FIG. 4 is a graph illustrating an example braking pressure build of a braking system incorporating the secondary path of the present disclosure.

In the event of a PBS 12 failure, the SBS 14 can build braking pressure within the calipers 60, 64 at a higher rate with respect to systems that do not include a secondary path 82. For example, FIG. 3 is a graph 200 illustrating an example pressure build over time within a SBS system not incorporating the secondary path 82 and one-way valves 84, 86. FIG. 4 is a graph illustrating an example pressure build within the SBS 14 described above.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for building pressure within a secondary braking system (SBS) of a vehicle having a plurality of brakes, the system comprising:

a reservoir;

a primary braking system (PBS) comprising:

a master cylinder including a primary circuit portion;
a plurality of valve subsystems;
a primary path connecting the master cylinder to the plurality of valve subsystems;
at least one valve disposed along the primary path between the master cylinder and the plurality of valve subsystems; and
a secondary path connecting the reservoir to at least one valve subsystem of the plurality of valve subsystems;
wherein the SBS is connected to the at least one valve subsystem, and
wherein the at least one valve subsystem includes a one-way valve that is configured to receive hydraulic fluid from the secondary path and output the hydraulic fluid to the SBS.

2. The system of claim 1, wherein the at least one valve subsystem includes a second valve that is configured to receive hydraulic fluid from the primary path and output the hydraulic fluid to the SBS.

3. The system of claim 2, wherein the second valve comprises a master cut valve.

4. A system for building pressure within a secondary braking system (SBS) of a vehicle having a plurality of brakes, the system comprising:
a reservoir;
a primary braking system (PBS) comprising:
    a master cylinder including a primary circuit portion;
    a plurality of valve subsystems;
    a primary path connecting the master cylinder to the plurality of valve subsystems;
    at least one valve disposed along the primary path between the master cylinder and the plurality of valve subsystems; and
    a secondary path connecting the reservoir to at least one valve subsystem of the plurality of valve subsystems;
wherein the SBS is connected to the at least one valve subsystem,
wherein the SBS further comprises a pump and a one-way valve associated with the pump, and
wherein the at least one valve subsystem includes an outlet that is configured to provide hydraulic fluid to the one-way valve associated with the pump from the secondary path.

5. The system of claim 4, wherein the pump is configured to control delivery of the hydraulic fluid to at least one caliper associated with the SBS.

6. The system of claim 4, wherein the SBS further includes a motor that is connected to the pump and is configured to actuate the pump.

7. The system of claim 6, wherein the SBS further includes an electronic control unit (ECU) that is configured to control the motor.

8. A system for building pressure within a secondary braking system (SBS) of a vehicle having a plurality of brakes, the system comprising:
a primary braking system (PBS) comprising:
    a master cylinder including a primary circuit portion and a reservoir;
    a plurality of valve subsystems;
    a primary path connecting the master cylinder to the plurality of valve subsystems;
    at least one valve disposed along the primary path between the master cylinder and the plurality of valve subsystems; and
    a secondary path directly connecting the reservoir to at least one valve subsystem of the plurality of valve subsystems;
wherein the SBS is connected to the at least one valve subsystem, the at least one valve subsystem including a one-way valve that is configured to receive hydraulic fluid from the secondary path and output the hydraulic fluid to the SBS.

9. The system of claim 8, wherein the at least one valve subsystem includes a second valve that is configured to receive hydraulic fluid from the primary path and output the hydraulic fluid to the SBS.

10. The system of claim 9, wherein the SBS further comprises a pump and a one-way valve associated with the pump, wherein the at least one valve subsystem includes an outlet that is configured to provide hydraulic fluid to the one-way valve associated with the pump from the secondary path.

11. The system of claim 10, wherein the pump is configured to control delivery of the hydraulic fluid to at least one caliper associated with the SBS.

12. The system of claim 1, wherein the master cylinder includes the reservoir.

13. The system of claim 4, wherein the master cylinder includes the reservoir.

* * * * *